July 11, 1950 C. L. DANIELS 2,514,746
TRAILER

Filed July 22, 1946 7 Sheets-Sheet 1

INVENTOR.
Cady L. Daniels:
BY Victor J. Evans & Co.
ATTORNEYS

July 11, 1950    C. L. DANIELS    2,514,746
TRAILER

Filed July 22, 1946    7 Sheets-Sheet 2

INVENTOR.
Cady L. Daniels:
BY Victor J. Evans & Co.
ATTORNEYS

July 11, 1950  C. L. DANIELS  2,514,746
TRAILER

Filed July 22, 1946  7 Sheets-Sheet 3

INVENTOR.
Cady L. Daniels:
BY Victor J. Evans & Co.
ATTORNEYS

July 11, 1950    C. L. DANIELS    2,514,746
TRAILER

Filed July 22, 1946    7 Sheets-Sheet 4

INVENTOR.
Cady L. Daniels:
BY Victor J. Evans & Co.
ATTORNEYS

July 11, 1950     C. L. DANIELS     2,514,746
TRAILER
Filed July 22, 1946     7 Sheets-Sheet 5

INVENTOR.
Cady L. Daniels
BY Victor J. Evans & Co.
ATTORNEYS

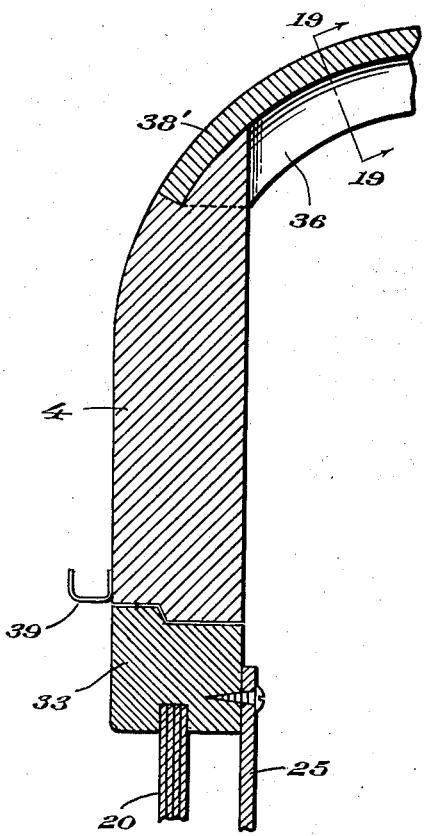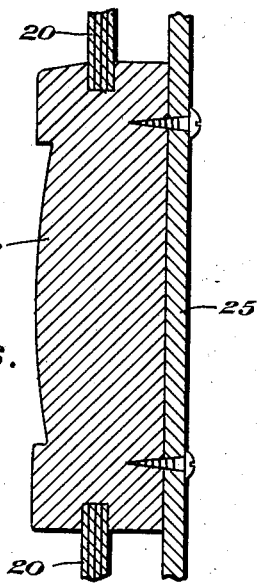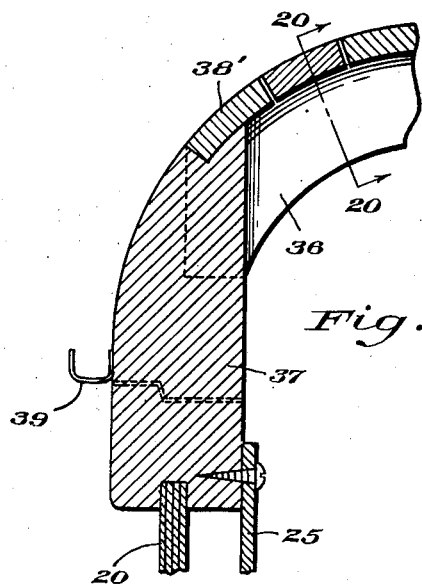

July 11, 1950 C. L. DANIELS 2,514,746
TRAILER
Filed July 22, 1946 7 Sheets-Sheet 7
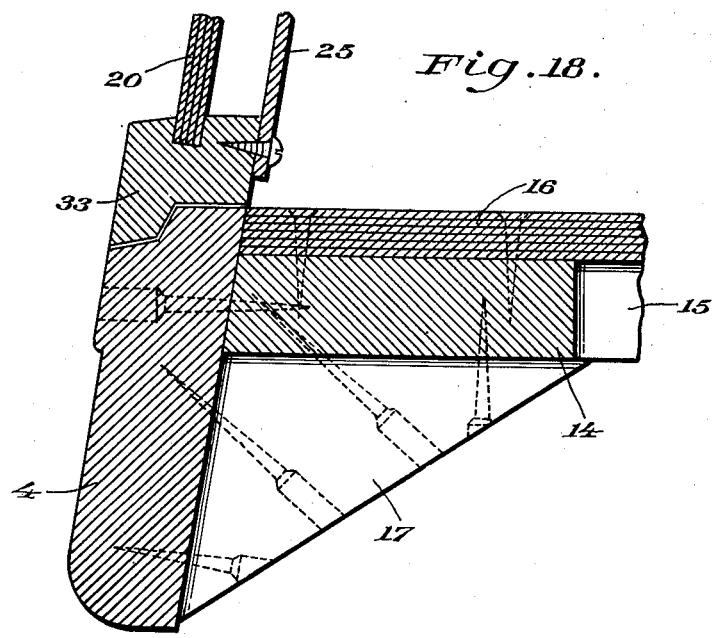
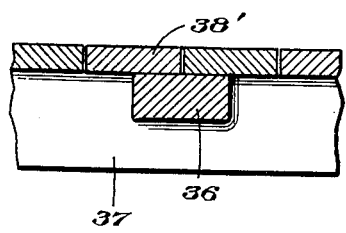
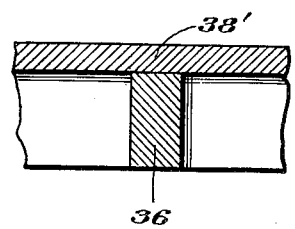
INVENTOR.
Cady L. Daniels:
BY Victor J. Evans & Co.
ATTORNEYS Patented July 11, 1950

2,514,746

UNITED STATES PATENT OFFICE 2,514,746

TRAILER

Cady L. Daniels, Colorado Springs, Colo.

Application July 22, 1946, Serial No. 685,316

1 Claim. (Cl. 62—117)

My present invention relates to an improved trailer and more particularly to a trailer especially adapted and fitted for utility purposes such as carrying luggage, storing foods and other necessities for camping or touring trips.

The trailer of my invention is designed to be drawn by an automobile or other suitable draft vehicle, and includes a refrigerator with cooling machinery, space for gasoline tanks, and space for luggage.

In carrying out my invention I utilize novel and unique combinations and arrangements of parts to accomplish the desired purposes and in the accompanying drawings I have illustrated one complete example of the physical embodiment of my invention according to the best mode I have thus far devised. It will be understood, however, that various changes and alterations may be made in the exemplified structure within the scope of the appended claim.

In the drawings:

Figure 15 is a detail sectional view taken at line 15—15 of Figure 6.

Figure 16 is a detail sectional view taken at line 16—16 of Figure 6.

Figure 17 is a detail sectional view taken at line 17—17 of Figure 1.

Figure 18 is a detail sectional view taken at line 18—18 of Figure 6.

Figure 19 is a detail sectional view taken at line 19—19 of Figure 15.

Figure 20 is a detail sectional view taken at line 20—20 of Figure 17.

Figure 1:
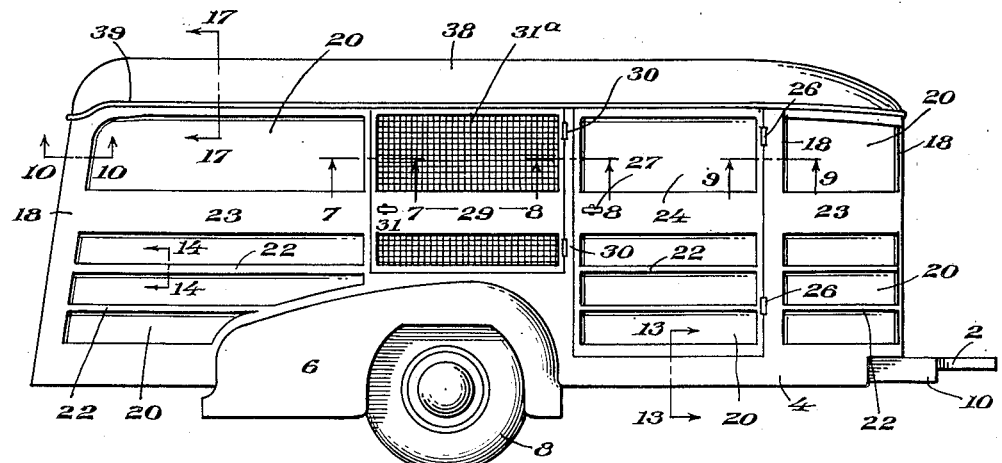
Figure 1 is a side elevational view of the trailer of my invention.
Figure 2:
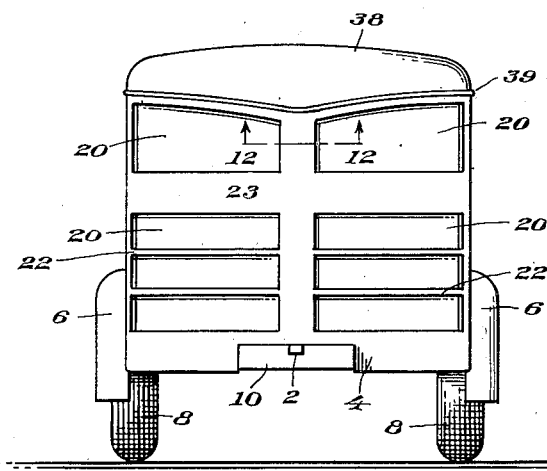
Figure 2 is a front elevational view.
Figure 3:
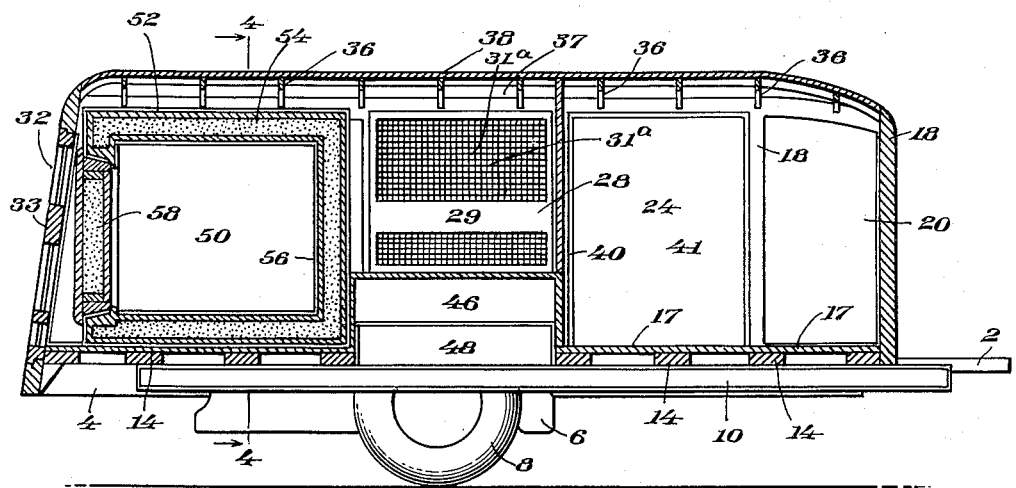
Figure 3 is a longitudinal vertical sectional view of the trailer.
Figure 4:
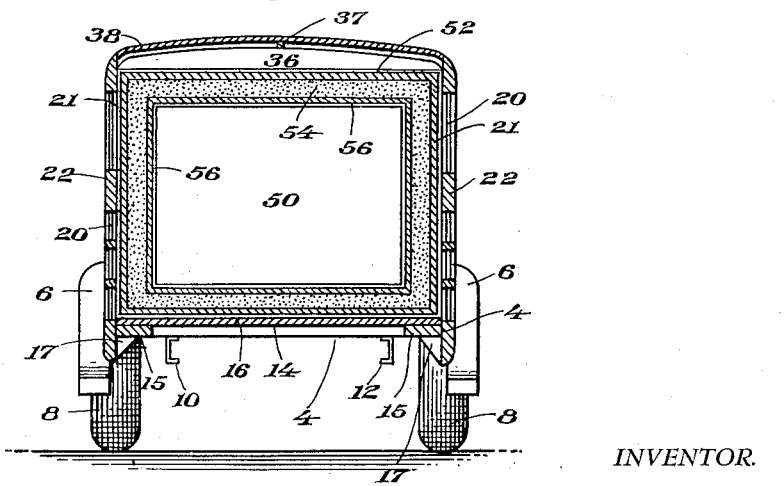
Figure 4 is a transverse vertical sectional view.
Figure 5:
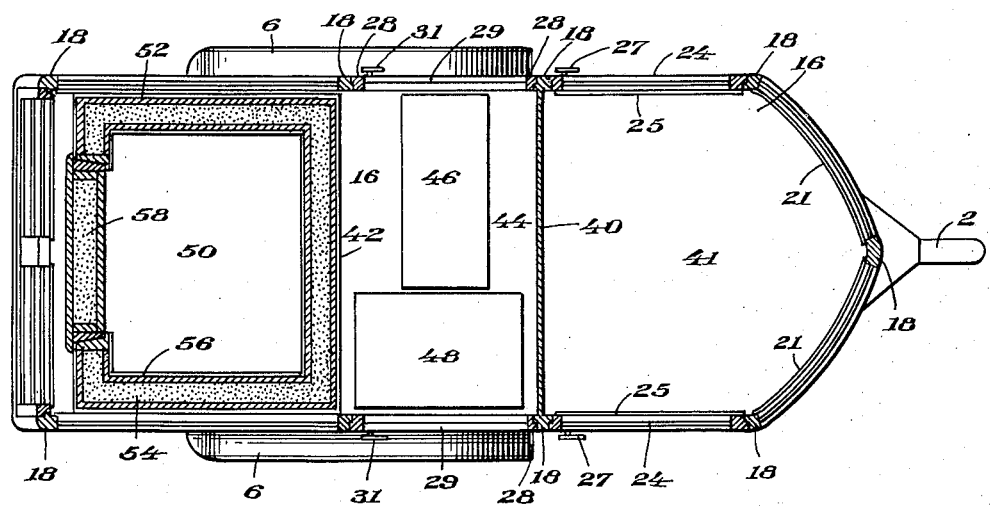
Figure 5 is a horizontal longitudinal sectional view.
Figure 6:
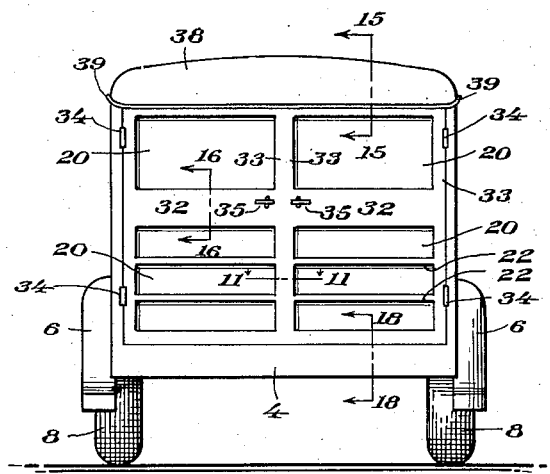
Figure 6 is a rear elevational view.
Figure 7:
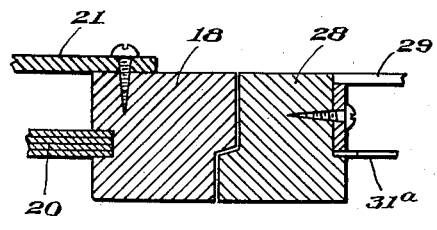
Figure 7 is a detail sectional view taken at line 7—7 of Figure 1.
Figure 8:
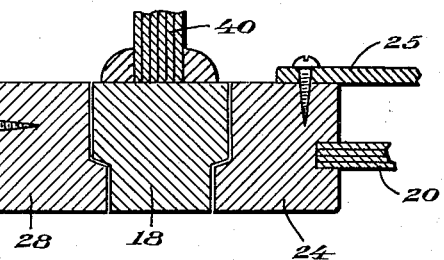
Figure 8 is a detail sectional view taken at line 8—8 of Figure 1.
Figure 9:
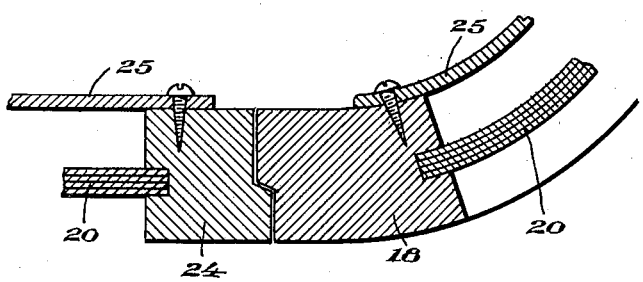
Figure 9 is a detail sectional view taken at line 9—9 of Figure 1.
Figure 10:
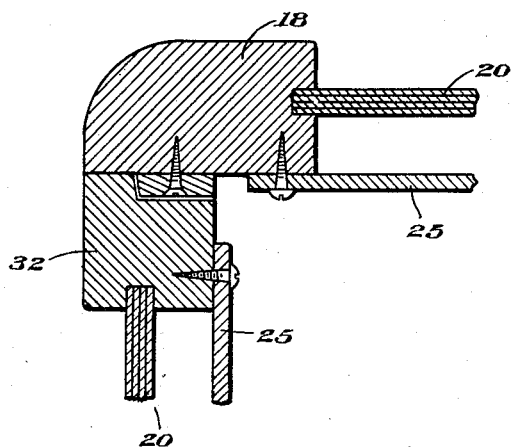
Figure 10 is a detail sectional view taken at line 10—10 of Figure 1.
Figure 11:
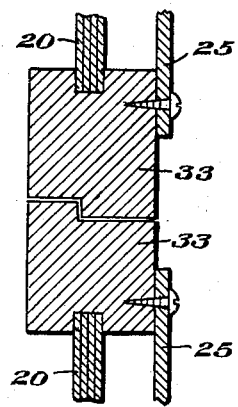
Figure 11 is a detail sectional view taken at line 11—11 of Figure 6.
Figure 12:
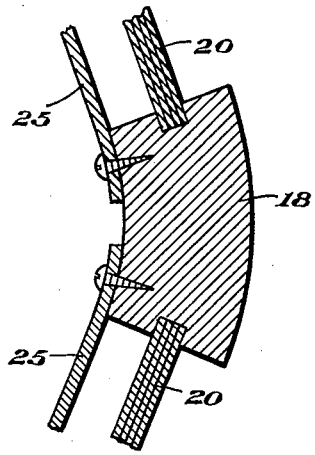
Figure 12 is a detail sectional view taken at line 12—12 of Figure 2.
Figure 13:
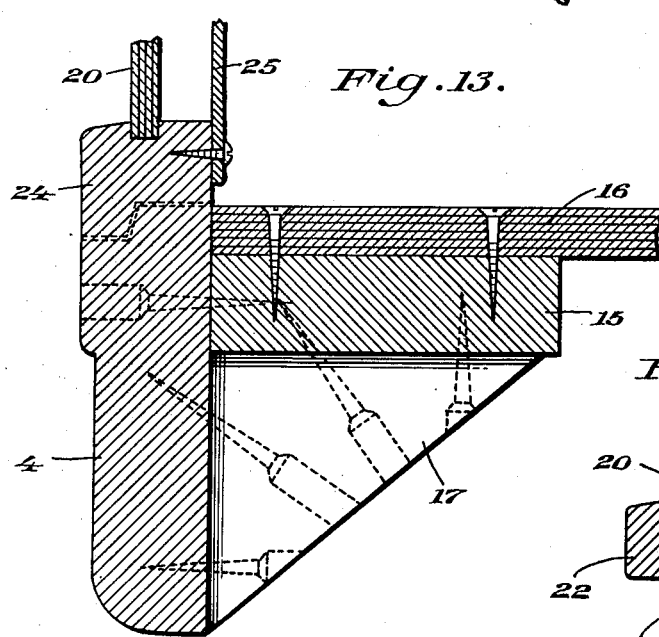
Figure 13 is a detail sectional view taken at line 13—13 of Figure 1.
Figure 14:
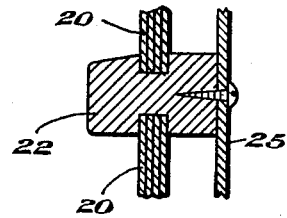
Figure 14 is a detail sectional view taken at line 14—14 of Figure 1.

Referring now to the drawings in detail wherein like numerals indicate like parts, I have illustrated the trailer of my invention having a tow bar 2 by means of which draft connection may be made with the drawing vehicle.

The trailer includes the body portion 4, fenders 6 and wheels 8. Lower longitudinally extending frame members 10 and 12 provide the main support for the trailer and upon these frame members which may be of any suitable material and shape but are preferably of channel iron as illustrated, I mount the transverse spaced supports 14, and the longitudinal supports 15.

The floor 16 is laid upon the transverse supports 14 and angle braces 17 provide for rigid maintenance of position of the floor structure. At spaced intervals around the vehicle the spacing to be determined by the design of the vehicle such as the positioning of doors, I utilize vertical posts 18 and panel 20 of thin strong material, preferably wood, secured to the vertical posts in suitable manner. The panels may be grooved into the vertical posts or otherwise secured. Interior of the posts and panels I employ a wall finish 21 and the air space between the panels and the walls forms an insulating medium.

Horizontal brace bars or finish bars 22 and a central wide bar 23 give a pleasing appearance to the exterior of the trailer and afford rigidity to the vertical posts 18.

Doors for access to the interior of the trailer are provided near the front as by doors 24 hinged at 26 on the vertical posts 18, and handles are indicated as at 27.

Central doors are indicated as at 28 having panels 29 and the doors are hinged at 30. Handles 31 provide for opening and closing the doors and these central doors are formed with screen or mesh 31a to admit air to the interior compartment enclosed by the central doors.

Rear doors 32 having frames 33 are hinged at 34 on the vertical posts and are provided with handles 35.

The top of the trailer is formed with transverse trusses 36 mounted on the longitudinal top truss braces 37 secured to the vertical posts 18, and the top 38 is laid on the trusses and may comprise flexible bent strips 38' over which may be laid cloth or other material. A drip trough 39 extends around the lower edge of the top to prevent water from running down over the doors.

A transverse partition 40 forms the forward compartment 41 for luggage or other items which it is desired to transport, and a rear partition 42 forms a central compartment 44 in which I employ a compressor as 46 and a tool box 48. The doors to this compartment are screened and permit access to air and permit circulation therethrough for the compressor.

Rearward of the rear partition 42 in the compartment formed between the said partition and the rear doors, I have illustrated a refrigerator 50 having an outer wall 52, insulation 54 and an inner wall 56. The refrigerator door 58 opens in the rear wall of the refrigerator and permits access to the refrigerator from the rear doors of the vehicle.

As illustrated in the detail figures of the drawings the various joints of the materials of the trailer are joined by wood screws and the braces and supports lend rigidity and stability to the trailer.

While I have illustrated the three compartments it will be obvious that a greater or lesser number of compartments may be utilized, and other use may be made thereof. It is possible to place in the compartments, cooking and heating equipment, and in fact any necessity for camping or touring may well be housed in the trailer of my invention.

Having thus fully described my invention what I claim as new and desire to secure by Letters Patent is:

A trailer comprising a supporting frame, transverse floor supports on the frame, and a floor on the said supports, spaced vertical posts on the frame, insulating walls connecting said posts, transverse partitions forming compartments, a central compartment for housing a refrigerator compressor, a refrigerator in the rear compartment and a luggage compartment for the front compartment, brace bars for the walls, longitudinal top supports on the vertical posts, transverse trusses laid on said top supports, a top laid on the top supports and doors in the trailer walls providing access to the respective compartments.

CADY L. DANIELS.

REFERENCES CITED

The following references are of record in the file of this patent:

UNITED STATES PATENTS

| Number | Name | Date |
| --- | --- | --- |
| 1,448,183 | Bang | Mar. 13, 1923 |
| 2,050,425 | Dean | Aug. 11, 1936 |
| 2,125,205 | Snowden | July 26, 1938 |
| 2,239,089 | Fageol | Apr. 22, 1941 |